(12) United States Patent
Zhang et al.

(10) Patent No.: US 12,092,875 B1
(45) Date of Patent: Sep. 17, 2024

(54) ROTATABLE CAPSULE FOR A FIBER OPTIC ROTARY JOINT

(71) Applicant: Princetel, Inc., Hamilton, NJ (US)

(72) Inventors: Boying B. Zhang, Hamilton, NJ (US); Hong Zhang, Singapore (SG)

(73) Assignee: Princetel, Inc., Hamilton, NJ (US)

( * ) Notice: Subject to any disclaimer, the term of this patent is extended or adjusted under 35 U.S.C. 154(b) by 0 days.

(21) Appl. No.: 18/653,653

(22) Filed: May 2, 2024

(51) Int. Cl.
*G02B 6/36* (2006.01)
*G02B 6/44* (2006.01)
*G02B 6/38* (2006.01)

(52) U.S. Cl.
CPC ......... *G02B 6/3604* (2013.01); *G02B 6/4427* (2013.01); *G02B 6/3871* (2013.01)

(58) Field of Classification Search
None
See application file for complete search history.

(56) References Cited

U.S. PATENT DOCUMENTS

| | | | | |
|---|---|---|---|---|
| 4,641,915 A | * | 2/1987 | Asakawa | G02B 6/3886 385/61 |
| 5,039,193 A | * | 8/1991 | Snow | G02B 6/3604 385/33 |
| 7,620,290 B2 | * | 11/2009 | Rizoiu | A61B 18/20 606/167 |
| 2010/0086892 A1 | * | 4/2010 | Rizoiu | G02B 6/262 433/29 |
| 2019/0056554 A1 | * | 2/2019 | Stone | H02J 50/90 |
| 2021/0181428 A1 | * | 6/2021 | Huber | G02B 6/3604 |

* cited by examiner

*Primary Examiner* — Jerry Rahll
(74) *Attorney, Agent, or Firm* — DANE IP Law PC

(57) ABSTRACT

A rotatable capsule for a fiber optic rotary joint and a method of using thereof is disclosed. The rotatable capsule may have a housing with one or more sections, where inside the housing there may exist multiple chambers. The rotatable capsule may be designed to be submerged under water and withstand high pressure loads during operation. A first chamber may be designed to support one or more shaft seals between a rotatable shaft and the housing of the capsule by equalizing the pressure of the outside environment with the usage of a high viscosity liquid fluid that is non-conductive and non-compressible. At least one other chamber may be designed to hold different portions of the fiber optic rotary joint and be sealed from the first chamber to provide a second level of sealing.

20 Claims, 2 Drawing Sheets

ROTATABLE CAPSULE FOR A FIBER OPTIC ROTARY JOINT

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various aspects and embodiments described herein relate to a rotatable capsule for a fiber optic rotary joint and method of using thereof.

Fiber optical rotary joints (FORJs) have been used for some time to transmit optical signals across a rotating interface. Fiber optic rotary joints also deliver reliable performance in applications like remotely operated vehicles (ROVs), underwater communication systems, and more. Such devices provide efficient data connection between static and rotating parts, enabling control and data collection in different environments. However, the implementation of fiber optic rotary joints in tough environmental conditions may be difficult.

Accordingly, there is a need in the art for an improved device, system, and method for utilizing fiber optic rotary joints in different environmental conditions.

BRIEF SUMMARY

The various embodiments and aspects disclosed herein address the needs discussed above, discussed below and those that are known in the art.

A rotatable capsule for a fiber optic rotary joint and a method of using thereof is disclosed. The rotatable capsule may have a housing with one or more sections, where inside the housing there may exist a plurality of chambers. The rotatable capsule may be designed to be submerged under water and withstand high pressure loads during operation. A first chamber may be designed to support one or more shaft seals between a rotatable shaft and the housing of the capsule by equalizing the pressure of the outside environment with the usage of a high-viscosity liquid fluid that is and non-compressible non-conductive. By way of example and not limitation, the liquid fluid may be grease. A second and third chamber may be designed to hold different portions of the fiber optic rotary joint and be sealed from each other and the first chamber to provide different layers of sealing within the capsule. The second and third chamber may also be filled with a high-viscosity liquid fluid that is non-conductive and non-compressible to maintain pressure equalization with the ambient underwater environment and ensure water does not enter the dry chamber within the fiber optic rotary joint.

The pressure equalization created by filling the first chamber of the rotatable capsule with high-viscosity and non-compressible liquid fluid (e.g., grease) may prevent the failure of the one or more shaft seals that act as a first layer of sealing between the inside of the capsule and the outside environment. If such sealing fails, seawater may not reach the second and third chambers holding the fiber optic rotary joint since the first chamber is filled with high-viscosity and non-conductive fluid (e.g., grease) and is sealed from the second and third chambers. If a water leakage occurs between the first chamber and the ambient underwater environment, and a leakage also occurs between the first and the second and third chambers, then the high-viscosity and non-conductive fluid (e.g., grease) occupying such chambers may mitigate the leakage and help prevent the fiber optic rotary joint from failing. This may be because the non-conductive fluid (e.g., grease) would leak inside the dry chamber within the fiber optic rotary joint first and would not allow any water leaked within the chambers reach such dry chamber in the body of the rotary joint.

More particularly, a rotary joint assembly for underwater applications is disclosed that may have a fiber optic rotary joint having a body with a rotor section and a stator section and a dry chamber within the body, a capsule having a housing sized and configured to receive the fiber optic rotary joint, the housing having a housing inlet opening and a chamber defined by an interior of the housing and holding the fiber optic rotary joint, the chamber configured to be completely filled with a non-conductive and non-compressible fluid (e.g., grease), the housing having a fiber bundle outlet sized and configured to receive a second fiber bundle of the fiber optic rotary joint, and a rotatable shaft rotatably coupled to the housing from the housing inlet opening and extending in the chamber, the rotatable shaft having a shaft bore configured for holding a first fiber bundle of the fiber optic rotary joint.

In some embodiments, the housing is configured to withstand pressure of up to 10,000 psi.

In some embodiments, the rotary joint assembly may further have a rotary shaft seal around the rotatable shaft and proximate to the housing inlet opening for creating a waterproof seal between the chamber of the housing and an ambient environment outside of the housing.

In some embodiments, the chamber of the housing is filled with the non-conductive and non-compressible fluid to equalize pressure with the ambient environment outside of the housing, the non-conductive and non-compressible fluid being less conductive than water.

In some embodiments, the waterproof seal created by the rotary shaft seal is configured to withstand pressure of up to 10,000 psi.

In some embodiments, the rotary joint assembly may further have a thrust bearing coupled to the rotatable shaft.

In some embodiments, the chamber of the housing is a first chamber, and the housing further comprises a second chamber proximate to the rotary shaft seal.

In some embodiments, the second chamber is completely filled with the non-conductive and non-compressible fluid, the non-conductive and non-compressible fluid being less conductive than water.

Furthermore, a rotatable capsule for a fiber optic rotary joint for underwater applications is disclosed that may have a housing sized and configured to receive the fiber optic rotary joint, the housing having a housing inlet opening and a chamber defined by an interior of the housing and an exterior of the fiber optic rotary joint, the chamber configured to be completely filled with a non-conductive and non-compressible fluid, a rotatable shaft rotatably coupled to the housing from the housing inlet opening and extending in the chamber, the rotatable shaft having a shaft bore configured for holding a first fiber bundle of the fiber optic rotary joint, the housing having a fiber bundle outlet sized and configured to receive a second fiber bundle of the fiber optic rotary joint.

In some embodiments, the housing is configured to withstand pressure of up to 10,000 psi.

In some embodiments, the rotatable capsule may further have a rotary shaft seal around the rotatable shaft and proximate to the housing inlet opening for creating a waterproof seal between the chamber of the housing and an ambient environment outside of the housing.

In some embodiments, the chamber of the housing is filled with the non-conductive and non-compressible fluid to equalize pressure with the ambient environment outside of the housing, the non-conductive and non-compressible fluid being less conductive than water.

In some embodiments, the waterproof seal created by the rotary shaft seal is configured to withstand pressure of up to 10,000 psi.

In some embodiments, the rotatable capsule may further have a thrust bearing coupled to the rotatable shaft.

In some embodiments, the chamber of the housing is a first chamber, and the housing further has a second chamber proximate to the rotary shaft seal.

In some embodiments, the second chamber is filled with the non-conductive and non-compressible fluid, the non-conductive and non-compressible fluid being less conductive than water.

Additionally, a method for assembling a rotary joint assembly is disclosed that may include inserting a fiber optic rotary joint having a dry chamber within a chamber of a capsule, the fiber optic rotary joint orientated within the chamber by having a rotary section of the fiber optic rotary joint facing a housing inlet opening of the capsule and a stator section of the fiber optic rotary joint facing a fiber bundle outlet of the capsule, rotatably coupling a rotatable shaft to the capsule through the housing inlet opening, the rotatable shaft extending inside the chamber and is coupled to the rotor section of the fiber optic rotary joint, coupling a first fiber bundle to a shaft bore of the rotatable shaft and also to the rotary section of the fiber optic rotary joint, and coupling a second fiber bundle to the stator section of the fiber optic rotary joint, the second fiber bundle extending out of the fiber bundle outlet of the capsule, completely filling the chamber of the capsule with a non-conductive and non-compressible fluid, the non-conductive and non-compressible fluid being less conductive than water, and sealing the capsule by using a rotary shaft seal around the rotatable shaft and proximate to the housing inlet opening to create a waterproof seal between the chamber of the capsule and an ambient environment outside of the capsule.

In some embodiments, the capsule is configured to withstand pressure of up to 10,000 psi.

In some embodiments, the non-conductive and non-compressible fluid equalizes pressure of the chamber with the ambient environment outside of the capsule for creating the waterproof seal.

In some embodiments, the method further has inserting the rotatable shaft through a thrust bearing within the capsule for coupling the rotatable shaft to the capsule.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
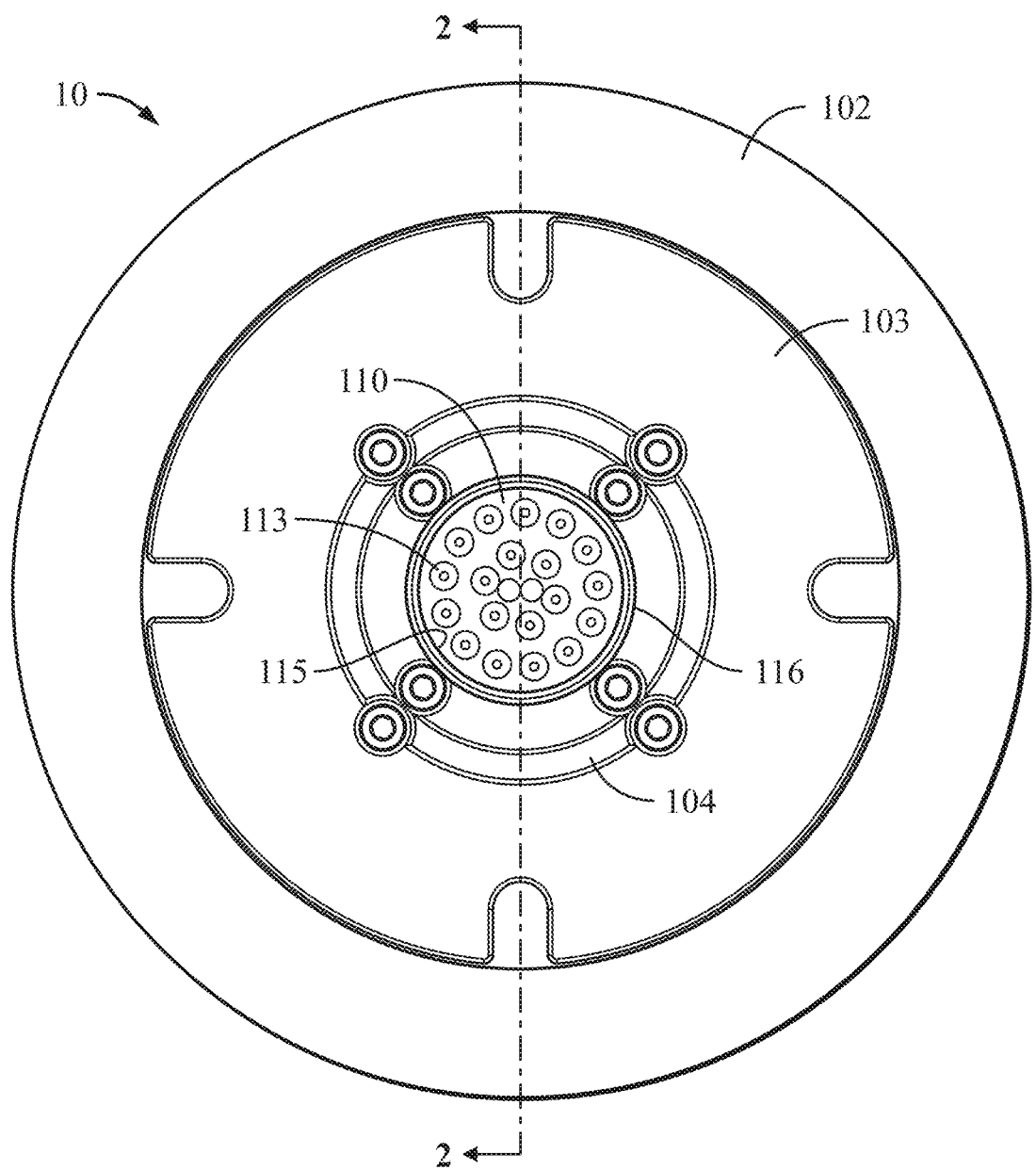
FIG. 1 shows a front view of a rotatable capsule where the rotor assembly and the fluid inside of the capsule is removed from the front of the rotatable shaft of the rotatable capsule.

Referring now to the figures, a rotatable capsule 10 for a fiber optic rotary joint 101 and a method of using thereof is disclosed. As shown in FIG. 1, and by way of example and not limitation, the rotatable capsule 10 may have a rotatable shaft 104 with a shaft bore 116 designed to carry a first fiber bundle 110 towards a fiber optic rotary joint 101 shown in FIG. 2. The cross-sectional view of the rotatable capsule 10 shows how the fiber optic rotary joint 101, specifically the dry chamber within the body of the device, may be protected by at least two layers of sealing from water and the accompanying underwater pressure exerted on the rotatable capsule 10. By way of example and not limitation, the first layer of sealing may be created by one or more shaft seals 109 around the rotatable shaft 104 near the housing inlet opening 133, which such sealing may be supported by pressure equalization created by a first housing cavity 121 having a high viscosity, non-conductive, and non-compressible fluid 117 (e.g., grease). By way of example and not limitation, the first housing cavity 121 may be completely filled with a high viscosity lubricating fluid 117 (e.g., grease) that is non-conductive (especially when compared to seawater) to provide equalizing pressure for the shaft seal 109 when such seal has a high-pressure load exerted thereon from the ambient environment (e.g., deep seawater). Alternatively, the first housing cavity 121 may be empty and have vacuum pressure or have normal sea-level atmospheric pressure (e.g., 14-15 psi).

By way of example and not limitation, the second layer of the sealing for the fiber optic rotary joint 101 may be a sealing between the first housing cavity 121 and a second housing cavity 122 that holds at least part of the fiber optic rotary joint 101. By way of example and not limitation, the second housing cavity 122 may also be completely filled with the high-viscosity, non-conductive, and non-compressible fluid 117 (e.g., grease) such that if any leakage occurs inside the dry chamber within the fiber optic rotary joint 101, such fluid leakage would be non-conductive fluid 117 that mitigates damage to the electrical and optical components of the rotary joint. By way of example and not limitation, the leakage inside the dry chamber within the fiber optic rotary joint 101 may occur through the rotational boundary 128 on the rotor section 151 of said rotary joint. The sealing between the first housing cavity 121 and the second housing cavity 122 may keep the fiber optic rotary joint 101 away from the saltwater outside of the rotatable capsule 10 if the shaft seal 109 is comprised. By way of example and not limitation, if water leaks within the first housing cavity 121 and there is a leakage between the first housing cavity 121 and the second cavity 122, then the high-viscosity fluid 117 (e.g., grease) may mitigate leakage between the chambers by clogging and slowing the flow. Additionally, if a leakage occurs at the rotational boundary 128 of the fiber optic rotary joint 101, the non-conductive fluid 117 would leak inside the dry chamber of the fiber optic rotary joint 101 first and mitigate damage to the internal components of said rotary device.

By using the rotatable capsule 10, a conventional fiber optic rotary joint 101 may be used in underwater and high-pressure applications. The fiber optic rotary joint 101 may not need to be designed to be filled with optical index match fluid and the device itself does not have to withstand high pressure by being equipped with pressure compensation mechanisms. The rotatable capsule 10 may take into account the requirements for operating under water and under high pressure.

Referring specifically now to FIG. 1, a front view of a rotatable capsule 10 is shown where the rotor assembly and the fluid is removed from the front of the rotatable shaft 104 of the rotatable capsule 10. By way of example and not limitation, the rotatable capsule 10 may have a first housing section 103 affixed to a second housing section 102 where the first housing section 103 may be an inner housing section inserted within the second housing section 102 (see FIG. 2) that may be considered an outer housing section. By way of example and not limitation, the first housing section 103 may hold the rotational and sealing components of the rotatable capsule 10, and the second housing section 102 may hold the fiber optic rotary joint 101. By way of example and not limitation, the first housing section 103 and the second housing section 102 may withstand pressures up to 12,000 psi. By way of example and not limitation, the first and second housing sections 103, 102 may be made from a non-conductive material, such as a non-metal. By way of example and not limitation, the non-conductive material making up the first and second housing section 103, 102 may be a composite material or a rigid polymer. Alternatively, the first and second housing section 103, 102 may be made from a metal alloy, such as steel or titanium alloy. As shown in FIG. 1, a rotatable shaft 104 may extend through the center of the first housing section 103 where the center of the rotatable shaft 104 has a shaft bore 116 that allows a first fiber bundle 110 to traverse through the first housing section 103 and couple with the rotor section 151 (see FIG. 2) of the fiber optic rotary joint 101. As shown in FIG. 1, and by way of example and not limitation, the first fiber bundle 110 may have a plurality of optical fibers 113 ranging between two to 40 optical fibers. The usage of a single optical fiber is also contemplated herein. By way of example and not limitation, the first fiber bundle 110 may be fixed inside the shaft bore 116 with the usage of epoxy 115. By way of example and not limitation, the first fiber bundle 110 may also be fixed to the rotor of the rotor section 151 of the fiber optic rotary joint 101 (see FIG. 2) via using an epoxy material.

Figure 2:
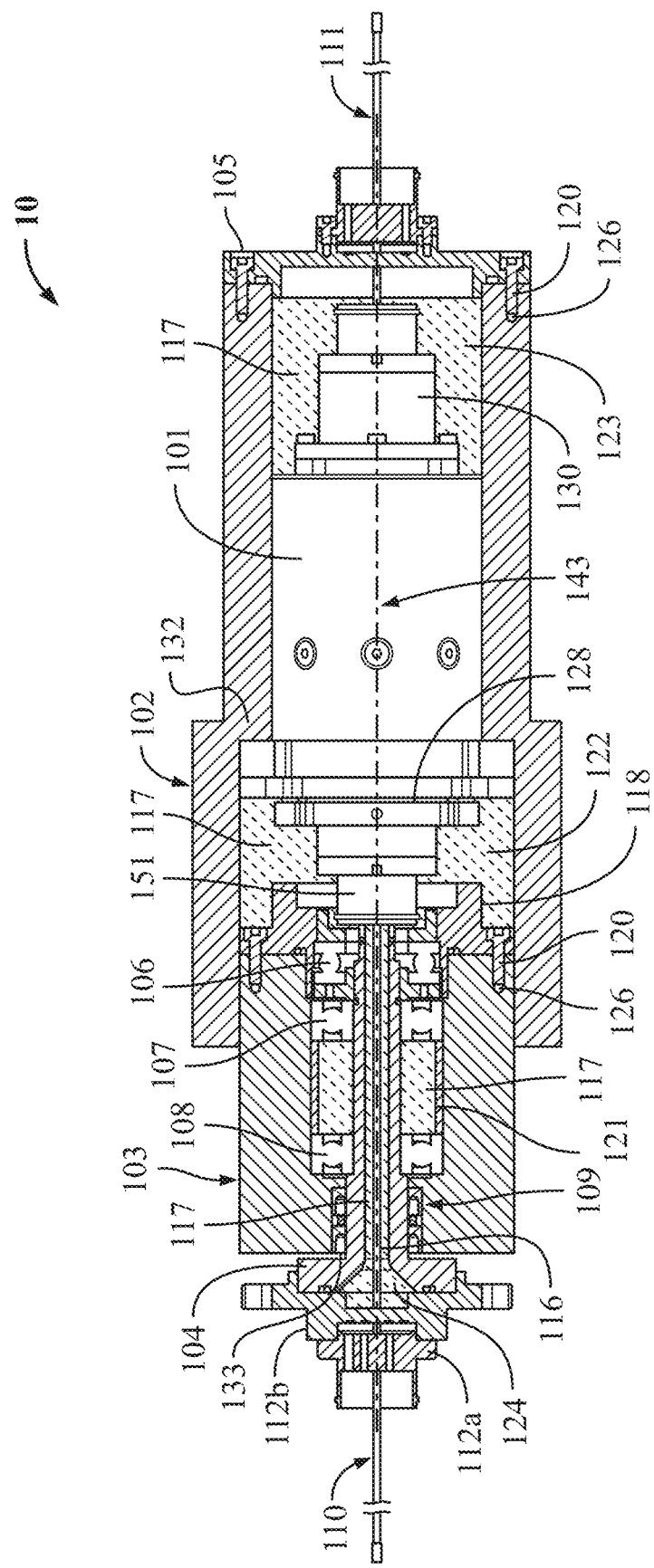
FIG. 2 shows a cross-sectional view of the rotatable capsule of FIG. 1, with the fiber optic rotary joint inside thereof, and the inside components of the rotatable capsule shown.

Referring now to FIG. 2, a cross-sectional view of the rotatable capsule 10 of FIG. 1, with the fiber optic rotary joint 101 inside thereof, and the inside components of the rotatable capsule 10 is shown. One purpose of the rotatable capsule 10 may be to create two levels of sealing between the fiber optic rotary joint 101 and the outside environment that may be deep water exerting a high load of pressure on the capsule. By way of example and not limitation, the first level of sealing may be a pressure equalizing sealing where the shaft seal 109 of the rotatable shaft 104 is reinforced by the pressure equalization between a first housing cavity filled with high viscosity fluid 117 (e.g., grease) and the ambient environment of the rotatable capsule. By way of example and not limitation, the first housing cavity 121 may contain and be completely filled with a high-viscosity, non-compressible, lubricant fluid 117 (e.g., vacuum grease) for equalizing pressure while allowing the rotatable shaft 104 to rotate. By way of example and not limitation, the second level of sealing may be between the first housing cavity 121 and a second housing cavity 122 containing at least a portion of the fiber optic rotary joint 101. By way of example and not limitation, the second housing cavity 122 may also be completely filled with the high viscosity, non-compressible, and non-conductive fluid 117 (e.g., grease) to keep the pressure balance with the first housing cavity 121. Alternatively, the second housing cavity 122 may not have the fluid 117 and have normal atmospheric pressure at sea level or be a vacuum chamber with vacuum pressure. The high viscosity of the non-compressible fluid 117 (e.g., grease) inside the first housing cavity 121 and the second housing cavity 122 may mitigate any water leakage created between the two chambers if both the shaft seal 109 and the sealing between the two chambers fail. Additionally, if there is a leakage inside the dry chamber of the fiber optic rotary joint 101 (e.g., through the rotational boundary 128 of the rotor section 151 inside the second housing cavity 122), the high viscosity and non-conductive would leak in the dry chamber first and mitigate damage to the internal electrical and optical components of the rotary joint.

By way of example and not limitation, a third level of sealing between the rotor section 151 and the stator section 130 of the fiber optic rotary joint 101 may also be created. Such sections of the fiber optic rotary joint 101 may be in their respective chamber 122, 123 within the second housing section 102, the chambers completely filled with the high viscosity non-conductive fluid 117. Alternatively, the second and third housing cavities 122, 123 of the second housing section 102 may not have the fluid 117 (e.g., grease) and have normal atmospheric pressure at sea level or be a vacuum chamber with vacuum pressure.

Referring now to the structural components of the system, and by way of example and not limitation, the first housing section 103 may have an end inserted within the second housing section 102. By way of example and not limitation, the first housing section 103 may be fastened to the second housing section 102 using fastening hardware, such as bolts or screws, or be welded, press-fitted, or bound using an adhesive. By way of example and not limitation, a first housing cavity 121 may exist within the first housing section 103, and such chamber may be between a first 108 and second bearing 107. By way of example and not limitation, the first bearing 108 and the second bearing 107 may be coupled to the rotatable shaft 104 and allow for the rotation of the rotatable shaft 104, said shaft extending through the first housing section 103, including the first housing cavity 121, and connecting to the rotor section 151 of the fiber optic rotary joint 101 inside the second housing cavity 122. By way of example and not limitation, the end of the rotatable shaft 104 proximate to a housing inlet opening 133 of the first housing section 103 may have one or more layers of shaft seals 109 between the rotatable shaft 104 and the first housing section 103 to prevent outside fluid (e.g., salt water) from leaking inside the first housing section 103 and the rotatable capsule 10, in general. By way of example and not limitation, the first housing cavity 121 behind the shaft seal 109 may be completely filled with a high-viscosity and non-compressible fluid 117 that may help maintain the integrity of the shaft seal 109 by equalizing the outside pressure with the pressure inside the first housing cavity 121.

The rotatable shaft 104 may be the structure that connects the first fiber bundle 110 to the rotor section 151 of the fiber optic rotary joint 101, specifically the rotor, and also translate rotational force to said rotor section 151. By way of example and not limitation, the rotatable shaft 104 may have an outer end extending out of the housing inlet opening 133 and coupled to an outer rotor assembly 112a-b providing the rotational force to the rotatable shaft 104 and the fiber optic rotary joint 101. By way of example and not limitation, the housing inlet opening 133 may be considered a rotational interface. By way of example and not limitation, the rotatable shaft 104 may be designed to rotate in the range of 100 to 400 revolutions per minute (RPM). By way of example and not limitation, the designed RPM of the rotatable shaft 104 may determine the viscosity of the lubricant fluid 117 inside the first housing cavity 121 in equalizing pressure, as described elsewhere herein.

By way of example and not limitation, the rotatable shaft 104 may extend from the inside of the first housing section 103 to the outside of the first housing section 103 and the rotatable capsule 10. By way of example and not limitation, one end of the rotatable shaft 104 may be coupled to the rotor of the rotor section 151 of fiber optic rotary joint 101 that may be placed in a slot of an interface end cap 118 that may be inside and in between the first housing section 103 and second housing section 102. By way of example and not limitation, the rotatable shaft 104 may also extend through the first housing cavity 121 within the first housing section 103, where such cavity may be designed to hold the necessary incompressible and highly viscous fluid 117 (e.g., grease) for leakage prevention. By way of example and not limitation, the rotatable shaft 104 may be inserted within the center holes of the first bearing 108 and the second bearing 107 near the two longitudinal ends of the first housing cavity 121 to allow such shaft to rotate about an axis of rotation 143 extending along the length of the rotatable capsule 101 and at its center. By way of example and not limitation, one or more shaft seals 109 may be implemented between the first housing section 103 and the rotatable shaft 104 near the housing inlet opening 133 of the first housing section 103 facing the ambient environment and being considered a rotational interface. By way of example and not limitation, the rotatable shaft 104 may also have a change in thickness profile in the portion of the shaft extending out of the first housing section 103 from the housing inlet opening 133. By way of example and not limitation, there may exist a shaft intake chamber 124 in the middle of such thick portion of the rotatable shaft 104. By way of example and not limitation, the shaft intake chamber 124 may be connected to the shaft bore 116 extending along the length of the rotatable shaft 104, and the shaft intake chamber 124 may have a larger volumetric opening area than the shaft bore 116. By way of example and not limitation, the shaft intake chamber 124 may be designed to also be completely filled with the high viscosity, non-conductive, and incompressible fluid 117 (e.g., grease). By way of example and not limitation, the first fiber bundle 110 may be inserting inside the shaft bore 116 through the shaft intake chamber 124 and be connected to the rotor section 151 of the fiber optic rotary joint 101.

As described elsewhere herein, and by way of example and not limitation, the first bearing 108 may be located proximate to one longitudinal end of the first housing cavity 121 closest and behind the one or more shaft seals 109. By way of example and not limitation, the second bearing 107 may be located proximate to a second longitudinal end of the first housing cavity 121 proximate to the interface end cap 118 that may be between the first and second housing sections 103, 102. As described elsewhere herein, and by way of example and not limitation, the rotatable shaft 104 may be inserted in the centers of the first bearing 108 and second bearing 107 to rotate about the axis of rotation 143. By way of example and not limitation, the first and second bearings 108, 107 may be ball bearings, roller bearings, or a combination thereof. By way of example and not limitation, a thrust bearing 106 may also be implemented proximate to, or within, the interface end cap 118 and behind the second bearing 107 to minimize axial movement of the rotatable shaft 104, particularly axial movement towards the fiber optic rotary joint 101. The high-pressure load outside of the first housing section 103 and the rotatable capsule 10, in general, may push the rotatable shaft 104 inwards towards the fiber optic rotary joint 101, which such force may displace the device in an incorrect location and orientation. The implementation of the thrust bearing 106 may mitigate the axial displacement of the rotatable shaft 104 about the axis of rotation 143 that may be caused by the high-pressure load of the outside environment. By way of example and not limitation, the thrust bearing 106 may be a thrust ball bearing.

By way of example and not limitation, one or more shaft seals 109 may be implemented between the first housing section 103 and the rotatable shaft 104 near the opening boundary between the first housing section and the ambient environment at the housing inlet opening 133. By way of example and not limitation, there may exist two layers of shaft seals 109 such that if one layer fails, the other layer of shaft seal may prevent outside fluid, such as salt water, from entering the first housing cavity 121. The two layers may also ease the pressure distribution exerted on such sealing mechanisms to allow for a better rotational motion of the rotatable shaft 104 that is contacting such shaft seals 109. By way of example and not limitation, the one or more shaft seals 109 may be rotary shaft seals, PTFE seals, spring energized seals, rubber seals, or a combination thereof, where such seals may be capable of withstanding low and high pressures in the range of 12 psi to 12,000 psi.

By way of example and not limitation, the first housing cavity 121 may be in the middle of the first housing section 103 and contain and be completely filled a high-viscosity, non-compressible, and lubricating fluid 117 (e.g., grease) that may be non-conductive and act as the pressure equalizing medium. By way of example and not limitation, the rotatable shaft 104 may extend through the middle of the first housing cavity 103, and the first housing cavity 103 may have a cylindrical or rectangular volumetric open area. By way of example and not limitation, the type of fluid 117 inside the first housing cavity 121 may be vacuum grease, high pressure grease, silicone lubricants (e.g., silicone grease), highly viscous gear oil (e.g., hypoid gear oil), heavy duty engine oil, or turbine oil. By way of example and not limitation, the first and second bearings 108, 107 may also be immersed in the aforementioned fluid inside the first housing cavity 103, where such fluid may act as lubrication for the rotation of the bearings. By way of example and not limitation, the aforementioned fluid types may also occupy and completely fill the second housing cavity 122 and the third housing cavity 123, where all the fluids 117 in the three housing cavities 121, 122, 123 may be the same or different.

By way of example and not limitation, the non-compressible fluid 117 (e.g., grease) inside the first housing cavity 103 may be non-conductive fluid since the rotatable capsule 110 may be designed to be submerged in water, which is a conductive fluid. By way of example and not limitation, the non-compressible fluid 117 (e.g., grease) may be less conductive when compared to water (e.g., seawater, salt water, or fresh water) that the rotatable capsule 10 is designed to prevent the water from reaching the fiber optic rotary joint 101. As explained elsewhere herein, such non-conductive fluid 117 may also occupy the second housing cavity 122 such that if there is a leakage between the dry chamber inside the fiber optic rotary joint 101 and the second housing cavity 122, the non-conductive fluid 117 (e.g., grease) may be the first fluid leaking in said dry chamber. Consequently, the internal electrical and optical components of the fiber optic rotary joint 101 may not get damaged. Such non-conductive fluid is a much better alternative than water leaking inside the second housing cavity 122 from the first housing cavity 121 since water is conductive. By way of example and not limitation, the viscosity of the non-conductive fluid 117 may be between 200 to 1,000 cSt at 40-degrees Celsius. The high-end range of viscosity may be designed for such fluid to slow down and mitigate any leakage between the first housing cavity 121, the second housing cavity 122, or the dry chamber of the fiber optic rotary joint 101 by clogging the leakage points and slowing down the leakage flow, especially around the rotational boundary 128 of the fiber optic rotary joint 101 that may be connected to the dry chamber of the rotary joint. The low-end range of the viscosity of the fluid may be designed for the rotatable shaft 104 to operate at higher speeds and RPMs with less resistance from the fluid. The high viscosity and non-conductive fluid 117 inside the first housing cavity 121 may also allow the shaft seals 109 to withstand high pressures of up to 12,000 psi, or any pressure range in between. By way of example and not limitation, the high-viscosity and non-conductive fluid 117 may operate between the temperature range of 33 to 100 Fahrenheit. Such pressure and temperature range may be derived based on the rotatable capsule 10 being used in marine applications and depending on the location of the body of water, how deep the device is located under water, and the amount of heat is created by the rotation of the rotatable shaft 104. By way of example and not limitation, the aforementioned fluid properties may also apply to the fluids 117 in the second housing cavity 122 and the third housing cavity 123, where all the fluids 117 in the three housing cavities 121, 122, 123 may have the same properties or different properties.

The first housing cavity 121 filled with the high-viscosity, non-conductive, and lubricating fluid 117 (e.g., grease) may reinforce the shaft seal 109 and prevent leakage by equalizing the pressure inside such housing cavity and the high-pressure load of the ambient environment. As described elsewhere herein, the rotatable capsule 10 may be designed to operate in deep water under high pressures. Consequently, pressure equalization may be needed between the ambient environment and the inside of the capsule to ensure the one or more shaft seals 109 do not fail and create water leakage reaching the fiber optic rotary joint 101. The high-viscosity, non-conductive, non-compressible, and lubricating fluid 117 (e.g., grease) inside the first housing cavity 121, as described elsewhere herein, may act to provide such pressure equalization by being behind the shaft seal 109 and providing an equalizing force by being incompressible to withstand the outside pressure exerted to the front of the shaft seal 109. The same fluid 117 in the first housing cavity 121 may also act as a lubricant for the rotation of the rotatable shaft 104 and the first and second bearings 108, 107. Additionally, the high viscosity of the fluid in the first housing cavity 121, as described elsewhere herein, may mitigate any leakage between the first housing cavity 121 and the second housing cavity 122 by clogging the leakage points and slowing down the leakage flow. Furthermore, the fluid 117 in the first housing cavity 121 may also be non-conductive such that if the fluid 117 leaks inside the second housing cavity 122, the fluid 117 would not damage the electrical and optical components of the fiber optic rotary joint 101 if the fluid 117 contacts the device, as described elsewhere herein.

By way of example and not limitation, an interface end cap 118 may be implemented as an intermediate structure between the first housing cavity 121 and the second housing cavity 122 of the first and second housing sections 103, 102, respectively, to act as a second sealing structure downstream of the one or more shaft seals 109. By way of example and not limitation, the interface end cap 118 may be separated from the first housing cavity 121 by the second bearing 107 and the thrust bearing 106. By way of example and not limitation, the interface end cap 118 may have a rotor slot to receive the rotor of the rotor section 151 of the fiber optic rotary joint 101. The rotor slot may allow the rotor to rotate within the stationary body of the interface end cap 118. By way of example and not limitation, the rotor slot may also have an opening to connect the rotatable shaft 104 and the first fiber bundle 110, inside thereof, with the rotor of the fiber optic rotary joint 101 through the interface end cap 118. By way of example and not limitation, the interface end cap 118 may also have a slot for the thrust bearing 106. By way of example and not limitation, the interface end cap 118 may be fixed to the inner end of the first housing section 103 using fasteners 120 (e.g., bolts and screws), where the inner end of the first housing section 103 may have corresponding fastening holes 126. Alternatively, latching mechanisms, adhesives, or welding may be used to fix the interface end cap 118 to the first housing section 103.

The fixing of the interface end cap 118 to the inner end of the first housing section 103 may create a sealed fluid storage space for the first housing cavity 121. Consequently, the interface end cap 118 may act as a second sealing structure where if the one or more shaft seals 109 at the other end of the first housing section 103 (near the housing inlet opening 133) fails when the rotatable capsule 10 is under deep water pressure, salt water may not enter the second housing cavity 122 and does not damage the fiber optic rotary joint 101. Furthermore, the viscous and non-conductive fluid 117 (e.g., grease) inside the first and second housing cavities 121, 122 may be the first fluid that would reach the dry chamber inside the fiber optic rotary joint 101 if a leakage occurs inside the rotary joint, for example from the rotational boundary 128 proximate to the rotor section 151. As described elsewhere herein, such highly viscous fluid may also clog and slow down the leakage inside the dry chamber of the fiber optic rotary joint 101 and mitigate damage to its internal electrical and optical components since such highly viscous fluid may be non-conductive.

Referring now to the second housing section 102 shown in FIG. 2, and by way of example and not limitation, such structure may have a continuous body containing the second housing cavity 122, explained elsewhere herein, that is connected to a third housing cavity 123. Alternatively, the second housing cavity 122 and the third housing cavity 123 may be viewed as one cavity (e.g., a single chamber instead of two chambers) since they are connected to each other. By way of example and not limitation, the second housing cavity 122 may have a cross-sectional area larger than the third housing cavity 123 to accommodate for the rotor section 151, interface end cap 118, the first housing section 103 and some of its components that are positioned inside the second housing section 102. Consequently, there may exist a change in cross-sectional area profile 132 between the second and third housing cavities 122, 123 of the second housing section 102, the cross-sectional area being greater for the second housing cavity 122 than the third housing cavity 123.

By way of example and not limitation, the fiber optic rotary joint 101 may be placed within the second housing section 102. By way of example and not limitation, the rotor section 151 of the fiber optic rotary joint 101 may be placed in the second housing cavity 122, and the stator section 130 and the middle portion of the fiber optic rotary joint 101 may be placed in the third housing cavity 123. By way of example and not limitation, a sealing layer may be applied between the fiber optic rotary joint 101 and the inside of the second housing section 102 at the boundary between the second housing cavity 122 and the third housing cavity 123. As such, the rotatable capsule 10 may have a third sealing structure, or layer, that is inside the second housing section 102 and creates a seal between the second housing cavity 122 and the third housing cavity 123. The third sealing may further protect the parts of the fiber optic rotary joint 101 in the third housing cavity 123 if some unwanted fluid (e.g., saltwater) leaks inside the second housing cavity 122 from the first housing cavity 121. By way of example and not limitation, such third sealing structure or layer may be PTFE seals, spring energized seals, rubber seals, epoxy, glue, or contact adhesive that is between the fiber optic rotary joint 101 and the inside of the second housing section 102 proximate to the boundary of the second and third housing cavities 122, 123. The fiber optic rotary joint 101 may alternatively be press fitted or welded with the inside of the second housing section 102 proximate to the boundary between the second and third housing cavities 122, 123 to create a sealing between the two chambers.

As explained elsewhere herein, and by way of example and not limitation, the second housing cavity 122 may hold the rotor section 151 of the fiber optic rotary joint 101 and be completely filled with the non-compressible and non-conductive fluid 117, described elsewhere herein. By way of example and not limitation, the rotor section 151 may include the rotor of the fiber optic rotary joint 101. Alternatively, the second housing cavity 122 may not be filled with fluid 117 and have sea level atmospheric pressure (14-15 psi), have a vacuum environment with vacuum pressure (e.g., pressure below atmospheric pressure), or pressure between 12 to 18 psi when the rotatable capsule 10 is submerged under deep water. The second housing cavity 122 may have the functional relation with the first housing cavity 121 of the first housing section 103, described elsewhere herein. By way of example and not limitation, a fiber optic rotary joint 101 having an inner dry chamber may be used that does not have to be filled with optical index match fluid nor withstand high pressures of the deepwater. The second housing cavity 122 may also hold the interface end cap 118, have a portion of the first housing section 103 inserted within, and hold some of the components of such structures as shown in FIG. 2 and described elsewhere herein.

As explained elsewhere herein, and by way of example and not limitation, the third housing cavity 123 may hold the middle portion and the stator section 130 of the fiber optic rotary joint 101. There may exist an opening space in the third housing cavity 123 where the stator section 130 is located to create a second chamber within the second housing section 102 to be completely filled with the non-compressible and non-conductive fluid 117 (e.g., grease), described elsewhere herein. Such fluid 117 may protect the internal components of the fiber optic rotary joint 101 within the third housing cavity since the fluid 117 (e.g., grease) may be non-conductive. The fluid 117 may also equalize pressure with the other two housing cavities 121, 122 by being non-compressible. Alternatively, the third housing cavity 123 may not have the fluid 177 and have sea level atmospheric pressure (e.g. 14-15 psi), a vacuum pressure, or pressure in the range of 12 to 18 psi when the rotatable capsule 10 is submerged in deep water. Furthermore, the sealing between the second housing cavity 122 and the third housing cavity 123, as explained elsewhere herein, may add an extra layer of protection for the stator section 130 to not get damaged if unwanted fluid (e.g., saltwater) leaks from the first housing cavity 121 inside the second housing cavity 122.

By way of example and not limitation, the end of the third housing cavity 123 farthest away from the second housing cavity 122 (i.e., the ending edge of the second housing section 102) may be enclosed by a housing end cap 105. By way of example and not limitation, the housing end cap 105 may have a center hole as a fiber bundle outlet to allow a second fiber bundle 111 to couple with the stator section 130 of the fiber optic rotary joint 101 and extend outside of the second housing section 102 and the rotatable capsule 10, in general. The second fiber bundle 111 may be designed to be stationary since such component is coupled to the stator section 130 of the fiber optic rotary joint 101. By way of example and not limitation, the second fiber bundle 111 may be fixed to the housing end cap 105 and the stator section 130 of the fiber optic rotary joint 101 by the usage of epoxy or other adhesives.

Referring to the fiber optic rotary joint 101 (FORJ) itself, and by way of example and not limitation, the device may be a FORJ having a dry chamber within its body that does not need to be filled with optical index match fluid and use other special pressure compensation mechanisms. The usage of such fiber optic rotary joint 101 and the omission of the aforementioned additional components may be possible in a deep water and high-pressure scenario because of the novel features of the rotatable capsule 101, described elsewhere herein. By way of example and not limitation, the fiber optic rotary joint 101 may have between two to 40 channels, and the rotor section 151 may operate between 100 to 400 RPM.

Referring back to the outer rotor assembly 112a-b attached to the rotatable shaft 104 of the first housing section 103, and by way of example and not limitation, such outer rotor assembly 112a-b may come in at least two components. By way of example and not limitation, the first component may be a rotor interface 112b that couples to the end of the rotatable shaft 104 that extends out of the housing inlet opening 133, such shaft section having a greater thickness profile than the rest of the shaft for such coupling with the rotor interface 112b. As explained elsewhere herein, and by way of example and not limitation, a shaft intake chamber 124 may be created between the rotor interface 112b and the thicker end of the rotatable shaft 104, the shaft intake chamber 124 being connected to the shaft bore 116 but having a larger volumetric opening. The shaft intake chamber 124 may allow the first fiber bundle 110 to extend through the rotatable shaft 104 and connect to the rotor 151 of the fiber optic rotary joint 101. By way of example and not limitation, the shaft intake chamber 124 may also be completely filled with the high viscosity, non-conductive, and non-compressible fluid 117 (e.g., grease), as described elsewhere herein, to equalize the pressure with the outside ambient pressure. The shaft bore 116 may also not have any empty space with air and be filled with the aforementioned fluid for the same reasons. Alternatively, the shaft intake chamber 124 may have sea-level atmospheric pressure (e.g., between 14 to 15 psi), vacuum pressure, or pressure within the range of 12 to 18 psi when the rotatable capsule 10 is submerged under deep water.

By way of example and not limitation, the second component of the outer rotor assembly may be a rotational mechanism 112a. By way of example and not limitation, the rotational mechanism may be in the form of a rotor motor that provides the rotational force to the rotatable shaft 104 and the rotor 151 of the fiber optic rotary joint 101. By way of example and not limitation, the first fiber bundle 110 may extend through the rotor assembly 112a-b and inside the rotatable shaft 104 to couple with the rotor 151 and the rotor section 151.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A rotary joint assembly for underwater applications, comprising:
    a fiber optic rotary joint having a body with a rotor section and a stator section and a dry chamber within the body;
    a capsule having a housing sized and configured to receive the fiber optic rotary joint, the housing having a housing inlet opening and a chamber defined by an interior of the housing and holding the fiber optic rotary joint, the chamber configured to be completely filled with a non-conductive and non-compressible fluid, the housing having a fiber bundle outlet sized and configured to receive a second fiber bundle of the fiber optic rotary joint; and
    a rotatable shaft rotatably coupled to the housing from the housing inlet opening and extending in the chamber, the rotatable shaft having a shaft bore configured for holding a first fiber bundle of the fiber optic rotary joint.

2. The rotary joint assembly of claim 1 wherein the non-conductive and non-compressible fluid is grease.

3. The rotary joint assembly of claim 1, further comprising a rotary shaft seal around the rotatable shaft and proximate to the housing inlet opening for creating a waterproof seal between the chamber of the housing and an ambient environment outside of the housing.

4. The rotary joint assembly of claim 3, wherein the chamber of the housing is filled with the non-conductive and non-compressible fluid to equalize pressure with the ambient environment outside of the housing, the non-conductive and non-compressible fluid being less conductive than water.

5. The rotary joint assembly of claim 4, wherein the waterproof seal created by the rotary shaft seal is configured to withstand pressure of up to 10,000 psi.

6. The rotary joint assembly of claim 3, further comprising a thrust bearing coupled to the rotatable shaft.

7. The rotary joint assembly of claim 3, wherein the chamber of the housing is a first chamber, and the housing further comprises a second chamber proximate to the rotary shaft seal.

8. The rotary joint assembly of claim 7, wherein the second chamber is completely filled with the non-conductive and non-compressible fluid, the non-conductive and non-compressible fluid being less conductive than water.

9. A rotatable capsule for a fiber optic rotary joint for underwater applications, comprising:
    a housing sized and configured to receive the fiber optic rotary joint;
    the housing having a housing inlet opening and a chamber defined by an interior of the housing and an exterior of the fiber optic rotary joint, the chamber configured to be completely filled with a non-conductive and non-compressible fluid;
    a rotatable shaft rotatably coupled to the housing from the housing inlet opening and extending in the chamber, the rotatable shaft having a shaft bore configured for holding a first fiber bundle of the fiber optic rotary joint;
    the housing having a fiber bundle outlet sized and configured to receive a second fiber bundle of the fiber optic rotary joint.

10. The rotary capsule of claim 9 wherein the non-conductive and non-compressible fluid is grease.

11. The rotatable capsule of claim 9, further comprising a rotary shaft seal around the rotatable shaft and proximate to the housing inlet opening for creating a waterproof seal between the chamber of the housing and an ambient environment outside of the housing.

12. The rotatable capsule of claim 11, wherein the chamber of the housing is filled with the non-conductive and non-compressible fluid to equalize pressure with the ambient environment outside of the housing, the non-conductive and non-compressible fluid being less conductive than water.

13. The rotatable capsule of claim 12, wherein the waterproof seal created by the rotary shaft seal is configured to withstand pressure of up to 10,000 psi.

14. The rotatable capsule of claim 9, further comprising a thrust bearing coupled to the rotatable shaft.

15. The rotatable capsule of claim 11, wherein the chamber of the housing is a first chamber, and the housing further comprises a second chamber proximate to the rotary shaft seal.

16. The rotatable capsule of claim 15, wherein the second chamber is filled with the non-conductive and non-compressible fluid, the non-conductive and non-compressible fluid being less conductive than water.

17. A method for assembling a rotary joint assembly, comprising:
    inserting a fiber optic rotary joint having a dry chamber within a chamber of a capsule, the fiber optic rotary joint orientated within the chamber by having a rotary section of the fiber optic rotary joint facing a housing inlet opening of the capsule and a stator section of the fiber optic rotary joint facing a fiber bundle outlet of the capsule;
    rotatably coupling a rotatable shaft to the capsule through the housing inlet opening, the rotatable shaft extending inside the chamber and is coupled to the rotor section of the fiber optic rotary joint;
    coupling a first fiber bundle to a shaft bore of the rotatable shaft and also to the rotary section of the fiber optic rotary joint, and coupling a second fiber bundle to the stator section of the fiber optic rotary joint, the second fiber bundle extending out of the fiber bundle outlet of the capsule;
    completely filling the chamber of the capsule with a non-conductive and non-compressible fluid, the non-conductive and non-compressible fluid being less conductive than water; and
    sealing the capsule by using a rotary shaft seal around the rotatable shaft and proximate to the housing inlet opening to create a waterproof seal between the chamber of the capsule and an ambient environment outside of the capsule.

18. The method of claim 17, wherein the capsule is configured to withstand pressure of up to 10,000 psi.

19. The method of claim 18, wherein the non-conductive and non-compressible fluid equalizes pressure of the chamber with the ambient environment outside of the capsule for creating the waterproof seal.

20. The method of claim 17, further comprising inserting the rotatable shaft through a thrust bearing within the capsule for coupling the rotatable shaft to the capsule.

\* \* \* \* \*